United States Patent [19]

Carr

[11] 4,245,420

[45] Jan. 20, 1981

[54] ARTIFICIAL BAIT FOR AQUATIC SPECIES

[76] Inventor: William E. S. Carr, 603 Mariposa St., St. Augustine Beach, Fla. 32084

[21] Appl. No.: 20,089

[22] Filed: Mar. 13, 1979

[51] Int. Cl.$^3$ .............................................. A01K 85/00
[52] U.S. Cl. ...................................... 43/42.06; 239/6; 239/34; 428/260; 428/289; 428/304; 428/306; 428/459; 428/473; 428/478.4; 428/478.8; 428/905
[58] Field of Search ............... 428/304, 306, 467, 473, 428/905, 478.4, 478.2, 535, 260, 289, 459, 478.8; 43/42.06; 239/6, 34

[56] References Cited

U.S. PATENT DOCUMENTS

| | | | |
|---|---|---|---|
| 2,797,519 | 7/1957 | Keller | 43/42.06 |
| 2,979,778 | 4/1961 | Fitzsimons | 43/42.06 |
| 3,567,118 | 3/1971 | Shepherd | 428/905 X |

OTHER PUBLICATIONS

Irwin, "Hydron", Popular Science, vol. 194, #2, Feb. 1969, pp. 92-95.
Cardarelli, "Concepts in Controlled Release", Chem. Tech., Aug. 1975, pp. 482-485.

*Primary Examiner*—James C. Cannon
*Attorney, Agent, or Firm*—Kerkam, Stowell, Kondracki & Clarke

[57] ABSTRACT

Artificial bait comprising a water-insoluble matrix which is permeable by diffusion at a predetermined and controlled rate over a prolonged period of time to an attractant incorporated therein upon immersion in an aqueous medium.

14 Claims, No Drawings

ARTIFICIAL BAIT FOR AQUATIC SPECIES

BACKGROUND OF THE INVENTION

The present invention relates to artificial bait particularly adapted for fishing in both fresh and sea water.

Artificial baits have been proposed heretofore comprising absorbent materials which have been soaked in a liquid fish attractant. Generally, the attractant-soaked material is incorporated in an artificial lure which depends for the attraction of fish upon the physical shape of the lure as well as the chemical characteristics of the attractant.

Thus, U.S. Pat. No. 1,393,617 discloses the inclusion of a fish oil soaked cotton swab in an artificial structure containing a hole through which the fish oil escapes upon immersion in water. U.S. Pat. No. 2,826,853 describes an artificial fish lure which contains a strip of chamois soaked with a fish attracting liquid such as anise, fish oil, etc.

U.S. Pat. No. 2,979,778 describes an artificial fishing lure constructed of rigid plastic in the shape of a natural fish prey having incorporated therein a fish attractant which is capable of migration through the plastic for progressive release at the surface.

U.S. Pat. No. 2,797,519 also describes an artificial lure which contains a porous resilient plastic or sponge rubber surface capable of absorbing fish attractant for subsequent release upon immersion in water.

It is an object of the present invention to provide an artificial bait comprising a matrix having incorporated therein an attractant which is capable of diffusion from the said matrix upon immersion in an aqueous medium at a predetermined and controlled rate over a prolonged period of time.

SUMMARY OF THE INVENTION

In its broadest aspect, the invention comprises an artificial bait comprising a semi-rigid, flexible, water-insoluble, hydrophilic matrix which is permeable, by diffusion, to the passage of an attractant incorporated therein and which is capable of releasing said attractant upon immersion in an aqueous medium at a predetermined and controlled rate over a prolonged period of time.

In its preferred aspect, the matrix comprises the solid or semi-solid phase of a colloidal solution of a liquid in a macromolecular substance; the attractant having been incorporated in the matrix by inclusion in the colloidal solution prior to the formation of at least a portion of the solid or semi-solid phase.

The thus-formed artificial bait comprises a tough, semi-rigid, flexible material which resembles, in texture, common fish prey and which contains a fish attractant which is released at a controlled rate over prolonged periods of time upon immersion in water. The artificial baits of the present invention are superior to those of the above-described art in that they more closely resemble common fish prey in that they are formed of hydrophilic, macromolecular substances and, further, in that the rate of release of attractant and the time periods over which the bait is effective are subject to better standards of control than in prior art artificial baits.

DETAILED DESCRIPTION OF THE INVENTION

In its preferred aspect, the semi-rigid, flexible, water-insoluble, hydrophilic matrix comprises the solid or semi-solid phase formed from a colloidal solution of a liquid, preferably water, in a macromolecular substance such as a protein, glyco-protein, phosphoprotein, gums, carbohydrates, pectins, natural polymers, synthetic polymers and mixtures thereof. The hydrophilic, gel-like solid phases of these colloidal solutions are peculiarly adapted for the formation of artificial fish baits having the texture and consistency of common and natural fish prey.

The attractant is preferably incorporated in the matrix by inclusion in the colloidal solution prior to the formation of at least a portion of the solid or semi-solid phase thereof. If the attractant is homogenously distributed throughout the colloidal solution prior to gelling to form the solid phase, the attractant will be uniformly distributed throughout the resulting matrix. If the colloidal solution is partially gelled prior to the addition of the attractant, the latter will be concentrated mainly at the outer surfaces of the resulting solid or gelled matrix. Thus, the matrix can be formed such that a gradient concentration of attractant is achieved throughout the dimensions of the bait.

The preferred matrix-forming substance is gelatin inasmuch as gels formed therefrom most closely resembly natural fish prey in texture and are subject to close control of attractant release rates. However, the matrix may be found from such materials as agar, carrageenan, starch and the like, and useful matrices may be formed by modifying gelatin-type gels with, for example, gel-like thickening materials such as acacia, agar, agarose carrageenan, guar gum, pectin, starch, proteins, collagen, and synthetic polymers such as polyvinylpyrrolidone, etc.

Matrices formed from these substances in gel-like form have a pliable, flesh-like texture which, when grasped or otherwise contacted by fish, feels and, when an attractant is incorporated therein, tastes like a natural food.

It is preferred to include within the matrix a flexible, reinforcing substrate which substantially maintains the physical integrity of the matrix upon immersion in an aqueous medium. Generally, the artificial bait is formed in flat layers and cut into strip-like lengths for use on a fish hook. It is preferred to pour the colloidal solution into a shallow pan and to place therein a layer of the reinforcing substrate prior to formation of the solid phase. The reinforcing element is then internally imbedded within the solid phase of the matrix, thereby acting as an internal reinforcement of the matrix.

Suitable reinforcing, flexible substrates include natural and synthetic woven and non-woven fabrics, paper, natural and synthetic plastics, leather, hide, metal, wood, and composites thereof It will be apparent to those skilled in the art that the reinforcing substrate may be included within the matrix at any point prior to formation of the completely gelled, solid phase of the colloidal solution.

It is also preferred to include within the colloidal solution a humectant such as glycerin which functions to maintain desirable moisture levels within the gelled, solid phase of the matrix.

Any suitable fish attractant may be incorporated within the matrix of the artificial bait. Suitable attractants include liquified fish or other marine products, fish oils, anise, synthetic attractants. Generally, any fish attractant in liquid form, capable of diffusion through the matrices of the artificial baits of the present invention may be utilized.

A suitable method for preparing a fish attractant involves the utilization of any existent natural bait, i.e. squid, shrimp, herring, Spanish sardines, bunker, etc. Additionally, materials which are normally disposed of in fishery operations, such as shrimp heads, fish heads, carcases, trash fish, trash invertebrates, etc., may also be employed to prepare attractant mixtures. Obviously, different attractant mixtures have a different stimulatory capacity for a particular species of fish. Accordingly, attractant mixtures may be tailored for specific "target" species.

Very useful attractants can be prepared following the procedure disclosed in the following publications:

Carr et al, "Chemical Stimulation of Feeding Behavior in the Pinfish, Lagodon rhomboides: A New Approach To An Old Problem", Comp. Biochem. Physiol., Vol. 54A, pp 161–166 (1976);

Carr et al, "Chemical Stimulation of Feeding Behavior in the Pinfish, Lagodon rhomboides: Characterization and Identification of Stimulatory Substances Extracted From Shrimp" Comp. Biochem. Physiol., Vol. 54A, pp 437–441 (1976);

Carr et al, "Chemoreception and Feeding Behavior in the Pigfish, Orthopristis chrysopterus: Characterization and Identification of Stimulatory Substances in a Shrimp Extract", Comp. Biochem. Physiol., Vol. 55A, pp 153–157 (1976);

Carr et al, "Chemoreception in the Pigfish, Orthopristis chrysopterus: The Contribution of Amino Acids and Betaine to Stimulation of Feeding Behavior by Various Extracts", Comp. Biochem. Physiol., Vol. 58A, pp 69–73 (1977);

The artificial bait is prepared by providing a colloidal solution of a liquid, preferably water, in the macromolecular substance which provides the resulting matrix; adding thereto the attractant and allowing the colloidal solution to substantially completely solidify thereby forming the matrix containing the entrapped attractant.

Where it is desired to include a flexible, reinforcing substrate, the latter is provided within the colloidal solution prior to complete solidification of the matrix.

Where it is desired to provide a gradient concentration of the attractant throughout a dimension of the matrix, the attractant is added to the colloidal solution in the desired shape after partial solidification and/or at various stages of the solidification process.

The humectant may be added to the colloidal solution at any time prior to solidification.

The amount of macromolecular substance may vary from about 2 to about 60%, preferably from about 10 to about 50% and most preferably from about 20 to about 40%, by weight, based on the weight of the artificial bait.

The liquid for forming the colloidal solution may vary from about 30 to about 98%, preferably from about 40 to about 80% and most preferably from about 50 to about 75%, by weight, based on the weight of the artificial bait.

The amount of any electrolyte added to the bait, such as sodium chloride, may vary from about 0 to about 15%, preferably from about 0 to about 5%, by weight, based on the weight of the artificial bait.

The salt or electrolyte is important to certain applications as the presence of salt in the matrix increases the differential between the solute concentration of the matrix and the solute concentration of the water in which the bait is fished. This differential results in a more rapid movement of water molecules into the matrix from the ambient medium. Enhanced water movement into the matrix increases the rate at which the mnatrix swells and softens, thereby increasing the rate of release of stimulant molecules from the matrix. Thusly, salt or electrolyte is important to the invention as another means of regulating the rate of stimulant release. Salt or electrolyte has another secondary function in certain cases in that it may be used to provide a somewhat softer matrix than is provided by matrix without salt.

The amount of attractant solute depends ultimately upon the intended use of the artificial bait and upon the nature of the attractant. Generally, the amount of solute containing attractant may vary from about 0.01 to 15%, by weight, based on the weight of the artificial bait.

The amount of humectant added, such as glycerin, may vary from about 0 to about 30%, by weight, based on the weight of the artificial bait. The humectant varies the texture and stability of the matrix. Increased amounts maintain the matrix soft and prevent overdrying. Additionally, it increases the stability of the matrix at elevated temperatures.

Generally, boiling or hot water is added to the desired amount of macromolecular substance and the mixtures stirred to form a colloidal solution or soft gel. Increased amounts of macromolecular substance increase the strength and the loading capabilities of the resulting gel but decrease the release rate of incorporated attractant.

The attractant is incorporated within the colloidal solution by stirring or mixing. Alternatively, the attractant may be added only to the surface of the partially solidified or soft gel by dropwise addition, spraying, sprinkling, etc. Preferably, the attractant is added to the surface of the soft gel after incorporation of the binder or reinforcing material. Surface attractant may be confined to the immediate surface of the artificial bait for fast release by applying it cold to the surface of the soft, warm, partially solidified colloidal solution or gel.

An alternative method for incorporating the attractant involves permitting the soft gel to set and then dehydrating the gel by drying. The gel is then rehydrated in an aqueous solution of attractant.

The colloidal solution or soft gel may be poured over the reinforcing material to provide strength and structural integrity. This procedure makes it very convenient to prepare the gels in sheets of convenient size using shallow trays or molds. Depending upon the characteristics of the desired product, the colloidal solution or soft gel may be poured onto the reinforcing material, or both under and onto the reinforcer. Alternatively, the reinforcing material may be added to the surface of the soft gel followed by the addition of further amounts of colloidal solution.

A further alternative embodies introduction of the colloidal solution or soft gel into a hollow reinforcing material.

The resulting gel containing reinforcing material and attractant may or may not be dried or dehydrated, depending upon the desired strength and texture. Drying increases strength, durability, and longevity of attractant release but decreases the rate of attractant release. Drying may be accomplished in a cold room (0°–8° C.) by circulating air over the gels via fans or blowers. Gels containing attractant which is resistant to, or stabilized against, thermal degradation may be dried as above utilizing temperatures up to ca, 30° C. Drying may also be accomplished in vacuo or by lyophilization. The duration of drying time is dependent upon the desired consistency of the finished bait. Drying times of 1 to 22 hours have been employed most frequently with baits intended for normal use.

Following completion of the drying step, the sheet of bait can be conveniently cut to any desired size for storage.

The baits are designed for placing on a hook and fishing in the same manner as is done with non-live natural baits. The baits can be fished alone or cut into strips or sections and used in conjunction with jigs and certain other conventional artificial lures, etc. Further, certain of the baits can be added to traps or pots to replace other baits or enhance the effectiveness of existing baits.

EXAMPLE 1

Firm Baits

Unless otherwise specified, the following formulations are based on the construction of sheets of bait with dimensions of ca. 6×9×⅜ in. deep when poured over and under a porous reinforcing substrate in a 6×9 in. tray. Each such sheet of bait is sufficient for cutting into ca. 20 individual baits. Tray or molds of any size can be used to provide baits of an array of sizes, thicknesses, and shapes. In the following examples, the following expressions and definitions apply:
  (a) hot water=water of a sufficient temperature to conveniently dissolve, suspend or uniformly disperse crystalline or powdered gelatin. Boiling water is preferred but hot water of a lesser temperature can be used.
  (b) cold room. The temperature of the cold room is ca. 4° C. However, any room with a temperature of less than ca. 10° C. would suffice.
  (c) drying of bait=placing in cold room in front of a stream of blown air, as from a fan or blower, for a described period of time. Baits containing attractant which is resistant to, or stabilized against, thermal degradation may be dried as above utilizing temperatures up to ca. 30° C.
  (d) "cutting and storing" of baits. After drying, sheets of bait can be conveniently cut to any desired size with scissors or other suitable cutting instrument. Storage refers to wrapping in freezer wrap or putting in an airtight container, and freezing until used. Baits containing attractant which is resistant to, or stabilized against, thermal degradation may be wrapped and/or placed in an airtight container and stored in a refrigerator or at room temperature.

EXAMPLE 2

Attractant confined to surface for fast release

Components for 312 ml gel:
117 g gelatin
195 ml water
Surface attractant—2.6 g dissolved in 8 ml water.
Procedure:
Dissolve gelatin in hot water and pour layer ca. ⅛ in. deep in bottom of tray. Quickly add reinforcer onto this material and pour rest of warm gel over binder or reinforcing material. While gel is still soft add cold surface attractant uniformly to warm gel surface. Place in cold room and dry for ca. 20 hours. Cut and store.

EXAMPLE 3

Attractant both internal and on surface to provide both rapid initial release and prolonged activity Components for 312 ml gel:
117 g gelatin
179 ml water
Internal attractant—3.9 g dissolved in 12 ml water.
Surface attractant—2.6 g dissolved in 8 ml water.
Procedure:
Dissolve gelatin in hot water. Preheat internal attractant to ca. 35° C. and stir uniformly into the above. Pour layer ca. ⅛ in. deep in tray, quickly add reinforcer onto this material, and pour rest of warm gel thereover. While gel is still soft, add cold surface attractant uniformly to warm gel surface. Dry in cold room for ca. 21 hours. Cut and store.

EXAMPLE 4

Attractant internal for prolonged activity

Components for 318 ml gel:
87 g gelatin
100 ml 3.5% NaCl
Internal attractant: 5.8 g dissolved in 125 ml 3.5% NaCl.
Procedure:
Dissolve gelatin in hot NaCl solution. Preheat internal attractant to ca. 35° C. and stir into the above. Pour half of this material into tray, add reinforcer, and pour rest of warm gel thereover. Dry in cold room for ca. 4 hours. Cut and store.

EXAMPLE 5

Soft Baits

Baits of a softer texture than those described can be prepared in several ways, i.e., by decreasing the amount of gelatin, by decreasing the drying time, by increasing the solute content (solute=attractant and/or NaCl), or by adding glycerin to the preparation. Combinations of these variables can be used to provide a wide array of textures. In the examples given below, sample formulations are given whereby "soft baits" have been constructed in several ways.

EXAMPLE 6

Attractant confined to surface for fast release. (Softness due to decrease in drying time)

Components for a 200 ml gel, ca. ¼ in. deep, in a 6×9 in. tray:
75 g gelatin
125 ml water
Surface attractant—2.1 g in 6 ml water
Procedure:
Dissolve gelatin in hot water and pour thin layer in tray. Quickly add reinforcer and pour remainder of material thereover. While gel is still soft, add surface attractant uniformly to surface. Dry in cold room for minimum time necessary to dry surface layer (ca. 4 to 5 hours). Cut and store.

EXAMPLE 7

Attractant both internal and on surface to provide both rapid initial release and prolonged activity. (Softness due to high solute content)

Components for 312 ml gel:
117 g gelatin 156 ml water
Internal attractant—7.8 g dissolved in 30 ml water.
Surface attractant—2 g dissolved in 8 ml water.
Procedure:

Dissolve gelatin in hot water. Preheat internal attractant to ca. 35° C. and stir into the above. Pour layer ca. ⅛ in. deep in tray, quickly add reinforcer, and pour rest of material thereover.

While gel is still soft, add cold surface attractant uniformly to surface. Dry in cold room for ca. 22 hours. Cut and store.

EXAMPLE 8

(Softness due to glycerin content)

Components for 333 ml gel:
106 g gelatin
85 ml glycerin
60 ml water
Internal attractant—3.4 g dissolved in 82 ml water.
Surface attractant—2.6 g dissolved in 10 ml water.
Procedure:

Stir gelatin into warm glycerin. Stir in hot water followed by internal attractant preheated to ca. 35° C. Pour layer ca. ⅛ in. deep in tray, quickly add reinforcer and pour rest of material thereover. While gel is still soft, add cold surface attractant uniformly to surface. Dry in cold room for ca. 22 hours. Cut and store.

EXAMPLE 9

Attractant internal for prolonged activity. (softness due to lesser amount gelatin, short drying time, and high salt content).

Components for 300 ml gel:
69.2 g gelatin
176 ml 3.5% NaCl
Internal attractant—2.5 g in 52 ml 3.5% NaCl.
Procedure:

Dissolve gelatin in hot NaCl solution. Warm internal attractant to ca. 35° C. and stir into the above. Pour ca. one-half of preparation in tray, quickly add reinforcer and pour rest of material thereover. Dry in cold room for ca. 3 hours.

EXAMPLE 10

(Softness due to glycerin content and no drying)

Components for 40 ml gel, ca. 3/16 in. deep, in 2½×8¾ in. tray:
12.6 g gelatin
6.4 ml glycerin
17 ml water
Internal attractant—1 g attractant in 3 ml water.
Procedure:

Stir gelatin into warm glycerin. Stir in hot water followed by internal attractant preheated to ca. 35° C. Pour ca. one-half of preparation in tray, quickly add reinforcer, and pour rest of material thereover. Let gel set in cold room until firm. Do not dry. Cut and store.

What is claimed is:

1. An artificial bait comprising a semi-rigid, flexible, water-insoluble, hydrophilic matrix which is permeable, by diffusion, to the passage of an attractant for aquatic species incorporated therein and which is capable of releasing said attractant upon immersion in an aqueous medium at a predetermined and controlled rate over a prolonged period of time, said matrix further characterized as the semi-solid phase of a colloidal solution of a liquid in a macromolecular water-insoluble, hydrophilic protein.

2. An artificial bait comprising a semi-rigid, flexible, water-insoluble, hydrophilic matrix which is permeable, by diffusion, to the passage of an attractant for aquatic species incorporated therein and which is capable of releasing said attractant upon immersion in an aqueous medium at a predetermined and controlled rate over a prolonged period of time; said matrix comprising the solid or semi-solid phase of a colloidal solution of a liquid in a macromolecular water-insoluble, hydrophilic protein.

3. The artificial bait of claim 2 wherein said attractant for aquatic species is incorporated in said matrix by inclusion in said colloidal solution prior to the formation of at least a portion of said solid or semi-solid phase.

4. The artificial bait of claim 1 wherein said matrix is internally reinforced with a flexible substrate which substantially maintains the physical integrity of said matrix upon immersion in an aqueous medium.

5. The artificial bait of claim 4 wherein said attractant for aquatic species comprises a substance which stimulates the instinctive feeding behavior of aquatic species.

6. The artificial bait of claim 1 wherein said protein is gelatin.

7. The artificial bait of claim 1 wherein said matrix additionally includes a humectant.

8. The artificial bait of claim 1 wherein said matrix additionally includes a water-soluble electrolyte.

9. The artificial bait of claim 4 wherein said reinforcing flexible substrate comprises a material selected from the group consisting of woven and non-woven textiles, paper, natural and synthetic plastic, leather, hide, metal, wood and mixtures thereof.

10. The artificial bait of claim 9 wherein said reinforcing flexible substrate is cotton toweling.

11. The artificial bait of claim 1 wherein said attractant for aquatic species is homogeneously distributed throughout said matrix thereby enabling a sustained and uniform release thereof upon immersion in an aqueous medium.

12. The artificial bait of claim 1 wherein said attractant for aquatic species is distributed in a gradient throughout said matrix.

13. The artificial bait of claim 12 wherein said attractant for aquatic species is distributed in a uniform gradient throughout said matrix and wherein the greatest concentration of attractant is at the outer surface of said matrix.

14. The artificial bait of claim 1 wherein said attractant for aquatic species is concentrated substantially at the outer surface of said matrix.

* * * * *